(12) United States Patent
Milberger et al.

(10) Patent No.: US 6,698,712 B2
(45) Date of Patent: Mar. 2, 2004

(54) BALL VALVE ASSEMBLY

(75) Inventors: Lionel J. Milberger, Houston, TX (US); Larry E. Reimert, Houston, TX (US); Jason C. McCanna, Houston, TX (US); Xhemal Kaculi, Houston, TX (US)

(73) Assignee: Dril-Quip, Inc., Houston, TX (US)

(*) Notice: Subject to any disclaimer, the term of this patent is extended or adjusted under 35 U.S.C. 154(b) by 0 days.

(21) Appl. No.: 10/137,219

(22) Filed: May 2, 2002

(65) Prior Publication Data

US 2003/0205688 A1 Nov. 6, 2003

(51) Int. Cl.⁷ .................................. F16K 31/12
(52) U.S. Cl. .................. 251/58; 251/315.01; 166/324
(58) Field of Search ............... 251/58, 315.01; 166/319, 321, 324

(56) References Cited

U.S. PATENT DOCUMENTS

| | | | |
|---|---|---|---|
| 2,894,715 A | * 7/1959 | Bostock | 251/58 |
| 4,113,231 A | 9/1978 | Halpine | 251/317 |
| 4,147,327 A | 4/1979 | Moran | 251/174 |
| 4,254,793 A | 3/1981 | Scaramucci | 137/246 |
| 4,256,282 A | * 3/1981 | Goldschild et al. | 251/58 |
| 4,317,490 A | 3/1982 | Milberger et al. | 175/20 |
| 4,386,756 A | 6/1983 | Muchow | 251/172 |
| 4,415,037 A | 11/1983 | Brooks | 166/331 |
| 4,448,216 A | * 5/1984 | Speegle et al. | 251/58 |
| 4,815,700 A | 3/1989 | Mohrfeld | 251/172 |
| 4,899,980 A | 2/1990 | Kemp | 251/175 |
| 4,911,408 A | 3/1990 | Kemp | 251/174 |
| 5,313,979 A | 5/1994 | Wang | 137/390 |
| 5,338,001 A | 8/1994 | Godfrey et al. | 251/58 |
| 5,551,665 A | 9/1996 | Noak et al. | 251/58 |
| 5,575,336 A | 11/1996 | Morgan | 166/330 |
| 5,575,363 A | 11/1996 | Dehrmann et al. | 192/3.3 |
| 6,176,316 B1 | 1/2001 | Hart | 166/368 |
| 6,293,517 B1 | 9/2001 | Cunningham | 251/315.02 |

FOREIGN PATENT DOCUMENTS

| | | | |
|---|---|---|---|
| GB | 2358207 A | 7/2001 | E21B/33/043 |
| WO | WO 00/15943 | 3/2000 | E21B/23/10 |
| WO | WO 01/53654 A1 | 7/2001 | E21B/21/10 |

* cited by examiner

Primary Examiner—John Bastianelli
(74) Attorney, Agent, or Firm—Browning Bushman, P.C.

(57) ABSTRACT

The ball valve assembly 10 includes a valve body 12, a ball 14, a seat ring 30, a support ring 40, and an actuator sleeve 50 surrounding the ball and axially moveable within the valve body for rotating the ball between the open position and the closed position. A plurality of seals seal with the seat ring, the actuator sleeve, the support ring, and the valve body. The actuator sleeve 50 maintains fluid pressure within the valve body. The ball, support ring and seat ring are each formed from a selective material to enhance life of the ball valve assembly. A pair of pins 80, 82 each extend in a slot within the ball and holes in the sleeve, and preferably the pair of pins and the ball rotate with respect to the sleeve as the sleeve moves axially within the valve body.

54 Claims, 9 Drawing Sheets

BALL VALVE ASSEMBLY

FIELD OF THE INVENTION

The present invention relates to ball valves and, more particularly, to a ball valve for use in an oil and gas production system and specifically within a tubing hanger of a production tree.

BACKGROUND OF THE INVENTION

The oil and gas production industry has historically relied upon gate valves for controlling fluid flow. Ball valves are, of course, widely used in other industries, e.g., in piping systems for handling various fluids. Ball valves have occasionally been used in the oil and gas production industry, but a ball valve is generally not considered as reliable as a gate valve due to concerns regarding reliable sealing between the seats and one or more of the valve body, the valve actuator, and/or the ball. Gate valves are, however, generally quite bulky and expensive compared to ball valves. In oil and gas production systems, the size of the valve is frequently a significant concern since the area around the production tree is limited, and the production tree includes numerous pieces of equipment, such as bulky gate valves, which must be reliably maintained and, if necessary, replaced.

Relevant prior art patents include Beazley, U.S. Pat. No. 5,313,979; Kemp, U.S. Pat. No. 4,911,408; Kemp, U.S. Pat. No. 4,899,980; Halpine, U.S. Pat. No. 4,113,231; Moran, U.S. Pat. No. 4,147,327; Scaramucci, U.S. Pat. No. 4,254,793; Mohrfeld, U.S. Pat. No. 4,815,700; Godfrey et al., U.S. Pat. No. 5,338,001; Milberger, et al., U.S. Pat. No. 4,317,490; Noack, et al., U.S. Pat. No. 5,551,665; Morgan, U.S. Pat. No. 5,575,336; and Muchow, 4,386,756. U.S. Pat. No. 6,293,513 discloses a ball valve having a convex seat. U.S. Pat. No. 6,176,316 discloses a subsea wellhead assembly with ball valves disposed within the vertical bores of the in-line tree assembly. U.S. Pat. No. 5,575,363 discloses a safety valve for use in a horizontal tree. The assembly includes a cylindrical spool supported for rotation about its longitudinal axis in the valve body. U.S. Pat. No. 4,415,037 discloses a ball valve assembly designed to eliminate tearing of the annular elastomeric seal which engages the periphery of the ball in response to excessive loading. U.K. Patent Application No. 2,358,207 discloses a subsea wellhead assembly using a pair of swab valves, a pair of control valves, a cross-over valve, and an annular master valve and another swab valve. Application WO 00/15943 discloses a ball valve intended to be offloaded from a valve seat during rotation. Application WO 01/53654 discloses a sleeve valve and a hydraulically actuated ball valve disposed in the annulus bore of a tubing hanger body.

The disadvantages of the prior art are overcome by the present invention, and an improved and relatively compact ball valve assembly is hereinafter disclosed which has particular utility in an oil and gas production system.

SUMMARY OF THE INVENTION

The ball valve assembly includes a valve body having an inlet port, an outlet port, a passageway between these ports for transmitting fluid, an open valve hydraulic port and a closed valve hydraulic port. A ball positioned within the valve body has a throughport therein and it is rotated between the open and closed position in response to axial movement of an actuator sleeve which surrounds the ball and is moveably responsive to hydraulic pressure in one of the hydraulic ports. A seat ring within the valve body seals with the spherical exterior surface of the ball when the ball is closed and fluid pressure is upstream or downstream of the ball. A support ring engages the exterior surface of the ball and supports the ball when fluid pressure is upstream of the ball.

A particular feature of the invention is to provide the ball valve assembly with a first seal between the seat ring and the actuator sleeve, a second seal between the support ring and the actuator sleeve, a third sleeve seal between the actuator sleeve and the valve body, a fourth seal between the seat ring and the valve body, and a fifth seal between the support ring and valve body. The first seal and the fourth seal are sized such that the pressure within the seat ring exerts an axially directed force on the seat ring which is transmitted to the ball. A related feature of the invention is that each of the seat ring and support ring has a substantially spherical ball engaging concave surface for mating engagement with the exterior surface of the ball. Each of the seat ring and support ring preferably also includes an inner convex surface spaced between the ball engaging surface and the inner diameter of the ring, and an outer convex radius surface spaced between the ball engaging surface and the outer diameter of the ring. The concave radius surface on the seat ring provides low pressure sealing with the ball and the inner convex radius surface on the seat ring provides high pressure sealing when the seat ring diameter increases.

A significant feature of the invention is that the actuator sleeve surrounds the ball and is axially moveable within the valve body for rotating the ball between the open position and the closed position, with hydraulic pressure in at least one hydraulic port moving the actuator sleeve within the valve body. The support ring which engages the exterior surface of a ball when the ball is in the closed position and supports the ball when the fluid pressure is upstream from the ball is prevented from sealing engagement of the ball and the support ring. The fluid passageway for preventing sealing engagement of the ball and the support ring may be provided in either the ball or the support ring. The actuating sleeve is continuous between an upper end above the ball and a lower end below the ball, such that the actuator sleeve maintains fluid pressure within the valve body when the ball is in the open position.

As a further feature of the invention, both the ball and the ball engaging ring are preferably formed from a high strength material, while the seat ring is formed from a low strength material. A high strength coating may be provided on surfaces of the seat ring which provide sealing engagement with the ball. A seat ring may be formed from steel, stainless steel, a nickel-base material, a titanium-base material or a beryllium copper material, while the ball and the ball engaging ring of the support ring may be formed from a ceramic material or a tungsten carbide material.

Yet another feature of the invention is that the ball includes radially opposing flats for cooperation with corresponding flats on the actuator sleeve. A pair of opposing pin members each extending between a flat on the ball and a corresponding flat on the actuator sleeve are positioning within a slot in the ball and a corresponding hole in the actuator sleeve to rotate the ball between the open position and the closed position in response to axial movement of actuator sleeve.

A feature of the invention is that seals that seal both bore pressure and hydraulic fluid pressure include a plurality of axially spaced sealing elements, with softer seal elements near fluid pressure and harder seal elements downstream from fluid pressure. A related feature of the invention is that each of these seals are bi-directional seals.

The seals which engage the seat ring cause the seat ring to move toward the ball in response to hydraulic fluid pressure within the interior of seat ring, while the seals which engage the support ring do not result in significant force pressing the support ring toward the ball when fluid pressure is interior of the support ring.

Another feature of the invention is that each of the seat ring and support ring has a wall thickness from 0.3 to 0.6 times the radius of the bore through the respective ring.

A further feature of the invention is that energizer springs may be used for urging the seat ring and the support ring, respectively, toward the ball.

Yet another feature of the invention is that the actuator sleeve supports a plurality of axially spaced guide rings to minimize contact between the actuator sleeve and the valve body.

Still a further feature of the invention is that the valve body is provided with both an open valve hydraulic port and a closed valve hydraulic port for axially moving the actuator sleeve, and the seat ring maintains hydraulic pressure exterior of the seat ring and the support ring maintains hydraulic pressure exterior of the support ring.

A further feature of the invention is that the support ring may comprise a ball engaging ring for engaging the exterior surface of the ball, and a dissimilar material seal ring spaced opposite the ball with respect to the ball engaging ring. A juncture of the ball engaging ring and the seal ring need not provide sealing integrity since the seal between the actuator sleeve and the seal ring is spaced opposite the ball with respect to the juncture between the dissimilar materials of the support ring.

A further feature of the invention is that a vent hole in the ball may be provided for venting pressure from the exterior cylindrical surface of the ball to the through port in the ball. A vent hole may also be provided in each of the pin members which interconnect the actuator sleeve to the ball.

A further feature of the invention is that the pin members which interconnect the ball to the actuator sleeve are constructed so that rotation of each pin member with respect to the ball is restricted, so that the pin members and the ball rotate as an assembly with respect to the actuator sleeve during movement of the actuator sleeve.

Another feature of the invention is that the valve body may be a tubing hanger for supporting a tubing string in a well. In alternate embodiments, the valve body is a manifold block or a downhole safety valve.

A significant advantage of the present invention is that the components of the ball valve are readily available, thereby allowing for the economical manufacture, use, and repair of the ball valve which has improved life and high reliability compared to prior art valves.

Another advantage of the present invention is that the valve body for the ball valve assembly may take on various configurations, such as the body of a tubing hanger, the body of downhole safety valve, or the body of a manifold.

These and further objects, features, and advantages of the present invention will become apparent from the following detailed description, wherein reference is made to the figures in the accompanying drawings.

DETAILED DESCRIPTION OF PREFERRED EMBODIMENTS

Figure 1:
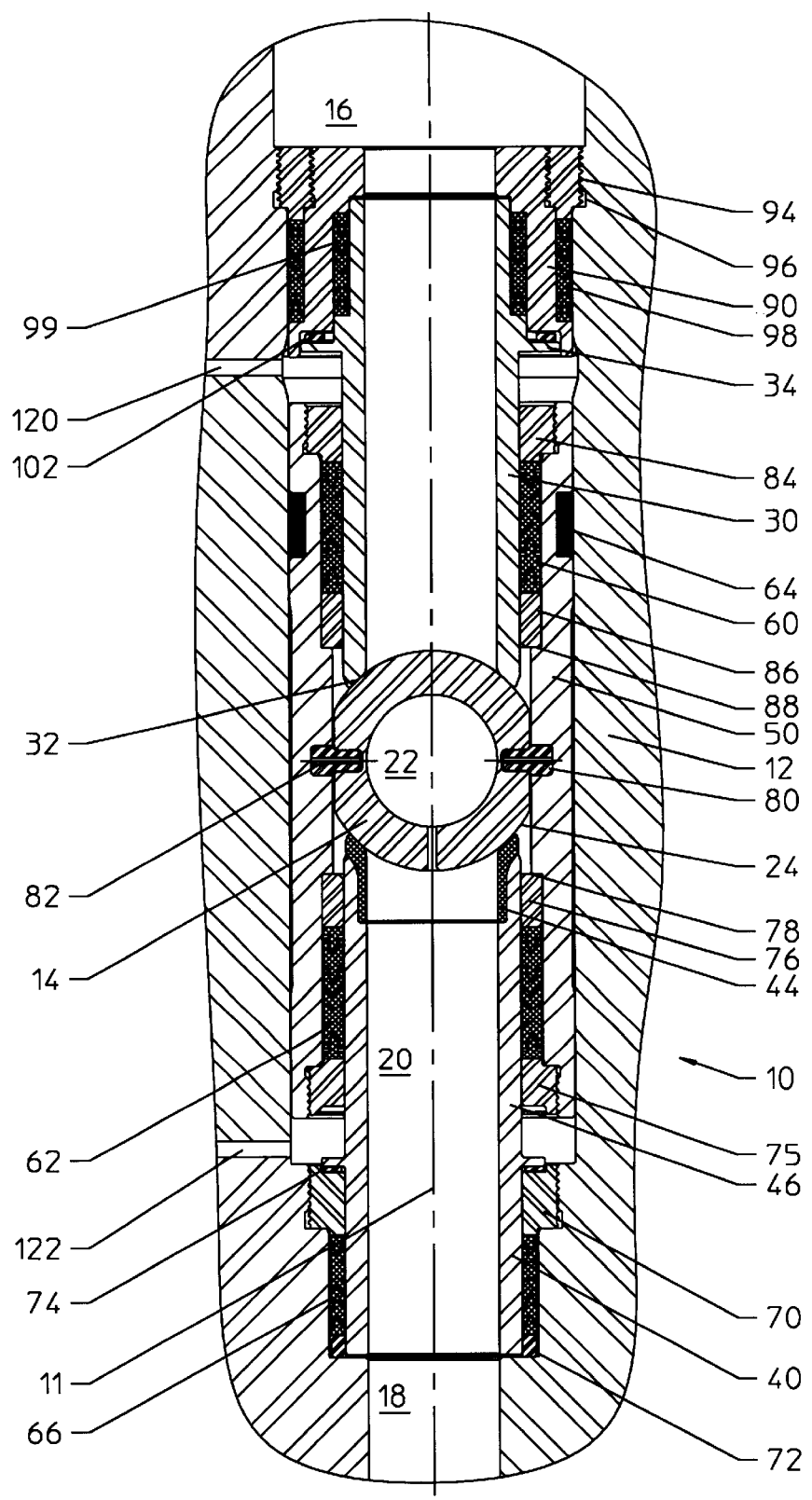
FIG. 1 is a cross-sectional view of a ball valve assembly with the depicted components positioned within a valve body.

FIG. 1 depicts one embodiment of the ball valve assembly 10 according to the present invention, including the valve body 12 and a ball 14 within the valve body for rotation between an open position and a closed position to control fluid flow through the valve body. The valve body 12 includes an inlet port 16, an outlet port 18, and a passageway 20 therebetween for transmitting fluid between the inlet port to the outlet port. The ball 14 positioned within the passageway 20 has a through port 22 therein and a spherical exterior surface 24. The actuator sleeve 50 moves to rotate the ball 14 within the passageway 20 between the open position and the closed position. The operation of the valve, and valve operating components, and valve sealing components are discussed below.

Those skilled in the art will appreciate that, in a preferred embodiment, all the components depicted in FIG. 1 are contained within the valve body, which preferably would be the case if the components were installed within a valve body which was a tubing hanger for suspending tubing string in a well. The configuration of the valve body itself may differ depending on the application. The valve of the present invention is particularly designed, however, for operation within a fluid stream wherein a seat ring seals with the closed ball when fluid pressure is either upstream or downstream of the ball.

The seat ring 30 as shown in FIG. 1 is a sleeve-shaped member with a ball seating surface 32. The support ring 40 is provided for engaging the exterior surface 24 of the ball when the ball is in the closed position and supporting the ball when fluid pressure is upstream of the ball. Valve operation is controlled by axial movement of actuator sleeve 50, which as shown surrounds the ball 14 and is moveable along axis 11 of the valve body 12 for rotating the ball 14 between the open position and the closed position.

Figure 3:
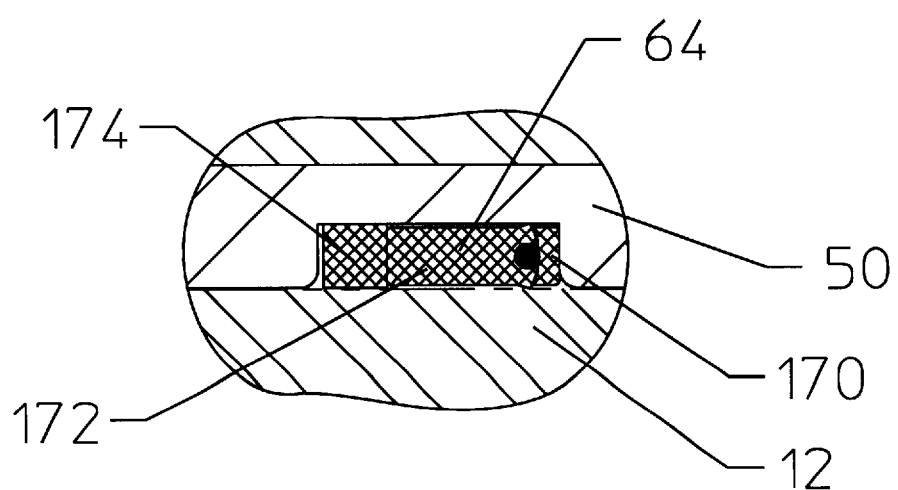
FIG. 3 is an enlarged view of the seal between the actuator sleeve and the valve body.

The ball valve assembly 10 as shown in FIG. 1 includes a first seal 60 between the seat ring 30 and the actuator sleeve 50, second seal 62, which may be identical to the first seal, for sealing between the support ring 40 and the actuator sleeve 50 (see FIG. 4), and a third seal 64 for sealing between the actuator sleeve 50 and the valve body 12 (see FIG. 3). The fourth seal, which may be a combination of seals 98 and 99, is discussed below.

Figure 5:
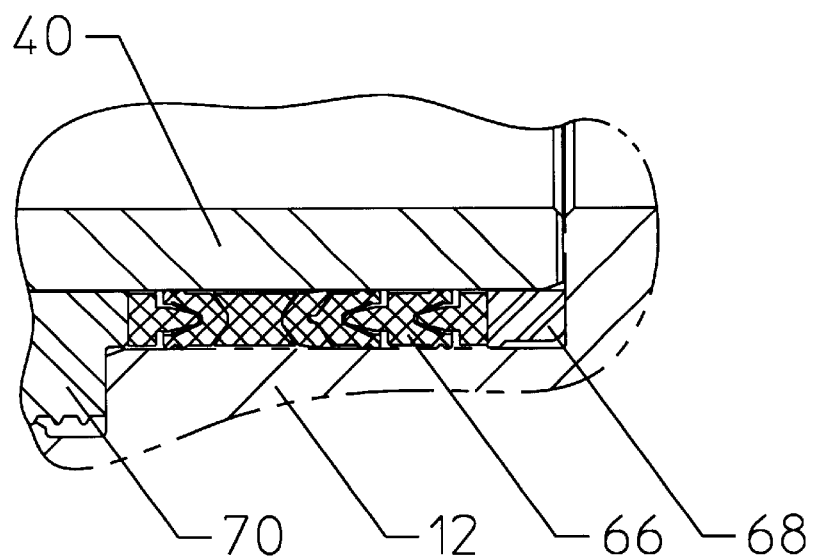
FIG. 5 is an enlarged view of the seal between the support ring and the valve body.

Other components of the assembly shown in FIG. 1 include a fifth seal 66 as better shown in FIG. 5 between the support ring 40 and the valve body. The seal 66 is thus trapped between a lower spacer ring 68 surrounding the support ring 40 and a lower nut 70, which may be threaded to the valve body. Rotation of the nut 70 thus compresses the seal 66, since spacer ring 68 is trapped against the end surface 72 on the valve body. During installation, the ring 68 and seal 66 may be positioned within the passageway 20 in the valve body, then the wave spring 74 and the support ring positioned within the passageway in the valve body. The wave spring 74 acts between a flange on support ring 40 and the lower nut 70, which is secured to the valve body, thereby biasing the support ring toward the ball.

The support ring 40, like the seat ring 30, is a sleeve-shaped member. Ring 40 as shown in FIG. 1 contains both a ball engaging ring 44 and a sleeve-shaped seal ring 46. The interconnection between the high strength ring 44 and the comparatively low strength seal ring 46 may be made by various configurations, including a threaded connection, a press fit, or welding. Since a fluid tight connection between parts 44 and 46 is not required, a slip connection may exist between these parts.

Referring again to FIG. 1, a lower piston nut 75 is threaded to a lower end of the actuator sleeve 50, and traps seal ring 76 and seal 62 between shoulder 78 on the actuating sleeve and the lower piston nut 75. An upper nut 84 similarly traps seal 60 and seal ring 86 against shoulder 88 on the actuator sleeve. A pair of pins 80 and 82 interconnect the ball 14 and the sleeve 50, as discussed further below.

An upper nut or other metal annular body 90 and a seal retainer ring 94 complete the assembly, with the ring 94 having exterior threads 96 for engagement with mating threads on the valve body and compressing the seal 98 against the upper nut 90. Wave spring 102 acts between the nut 90 and the flange 34 on the seat ring 30 to bias the seat ring toward the ball in a manner similar to the wave spring 74 acting against the support ring. Seal 99 seals between the nut 90 and the seat ring 30, so that the combination of seals 98 and 99, which may be considered the fourth seal, seal between the upper seat ring 30 and the valve body 12. Use of two seals 98, 99 and nut 90 thus allow for ease of fabrication and assembly of the components within the valve body.

According to a preferred embodiment, the energizing springs 74 and 102 have a substantial equal biasing force for biasing the support ring 40 and the seat ring 30, respectively, toward the ball. The axially generated biasing force of each of these springs is sufficient to overcome the friction of seals 62, 60, respectively, between the respective ring and the actuator sleeve.

Figure 9:
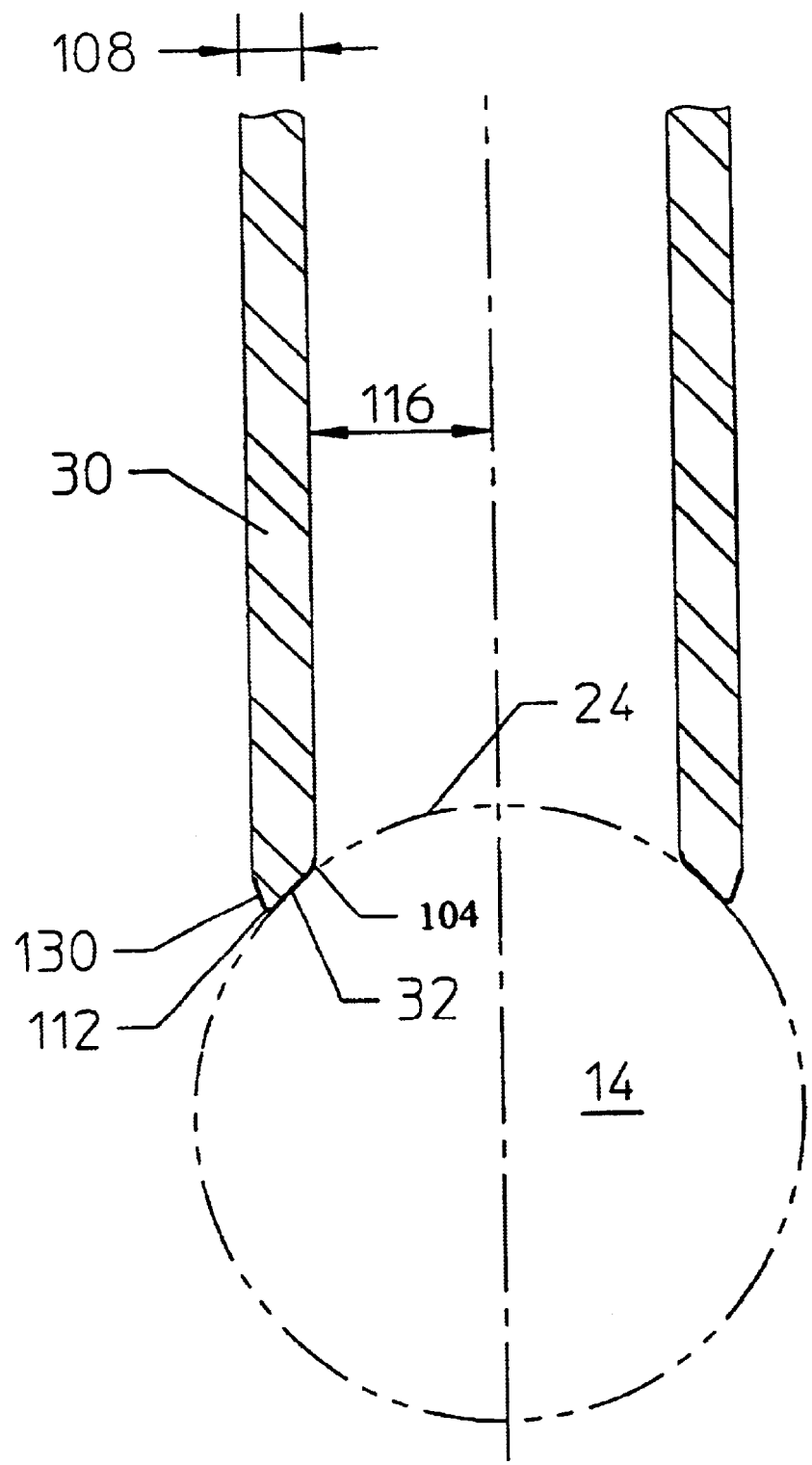
FIG. 9 depicts a lower end of the seat ring for sealing with the ball.
Figure 10:
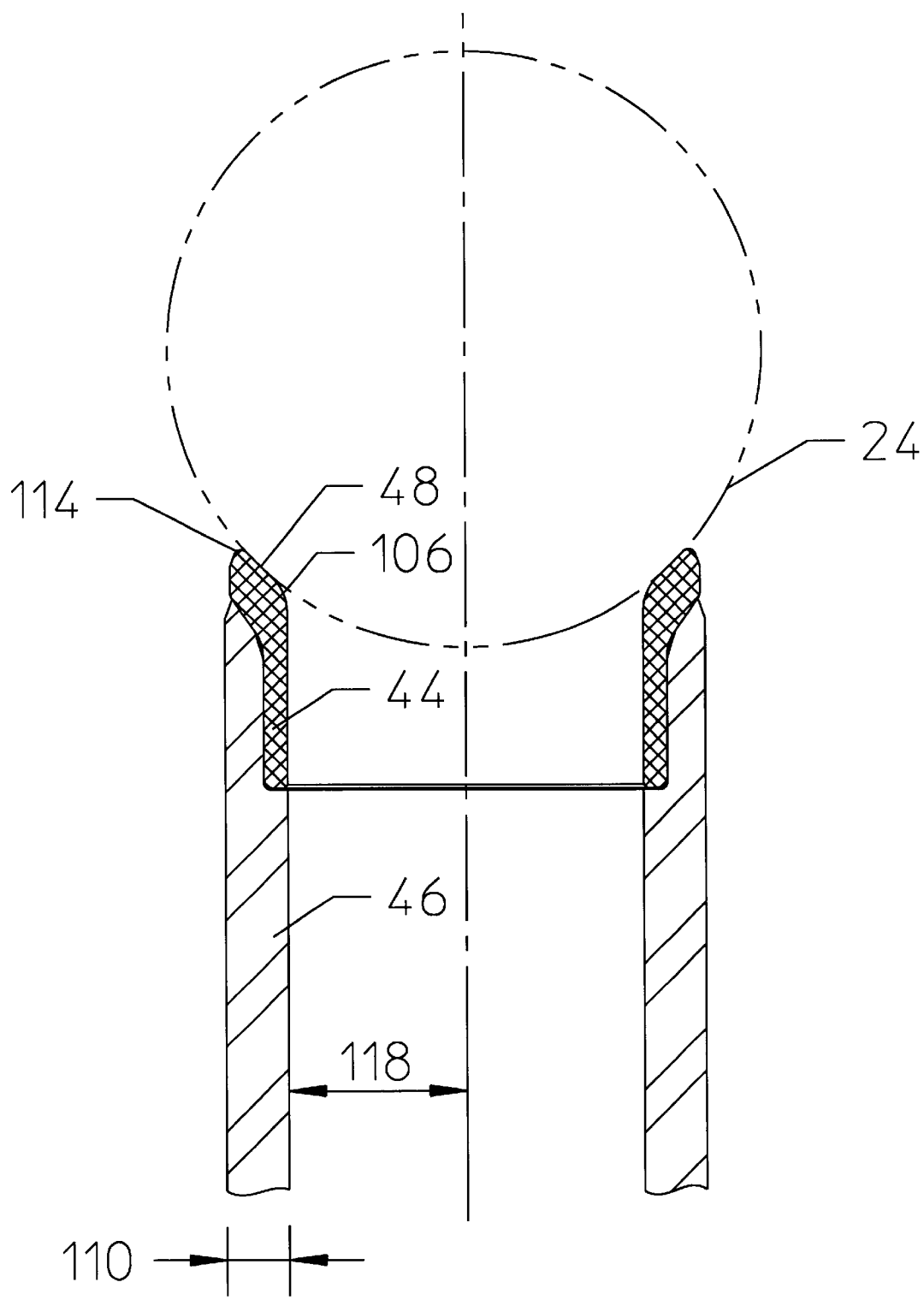
FIG. 10 depicts an upper end of the support ring for supporting the ball.

As shown in FIG. 9, the seat ring 30 includes a substantially spherical ball engaging concave radius surface 32 for sealing engagement with the exterior surface 24 of the ball 14. The support ring 40 as shown in FIG. 10 has a similar concave radius surface 48 for mating engagement with the exterior surface 24 of the ball. The rings 30, 40 have spherical concave surfaces 32, 48 contoured to provide a large low pressure sealing surface on ring 30 for engagement with the ball, and to minimize concentrated stresses at the interface between the support ring 40 and the ball. Each ring 30 and 40 also include a convex radius surface 104, 106 spaced between the concave radius surface 32, 48 and an inner diameter of each ring. In a preferred embodiment, each convex radius surface 104, 106 has a radius less than one half a wall thickness of the respective ring. In a preferred embodiment, the convex radius surface 106 on the support ring 40 has significantly larger radius, and preferably at least 50% larger, than the convex radius surface 104 on the seat ring. The concave radius surface 32 on the seat ring provides a low pressure seal for sealing engagement with the ball, and the convex radius surface 104 provides high pressure sealing engagement with the ball when the seat ring 30 "grows" or expands in diameter due to high pressure fluid forces and forces transmitted to the seat ring 30 from the ball. The sealing surfaces of the seat ring 30 which contact the ball 14 thus have a compound curvature, consisting of a concave portion and one or more convex portions.

The wall thickness of each ring 30, 40 should be understood to be thickness 108 for the seat ring 30 and the thickness 110 for the support ring 40. Each of the seat ring and the support ring preferably have a wall thickness 108, 100 from 0.3 to 0.6 times the radius 116, 118 of the bore through the respective ring. Each ring 30, 40 further includes a second convex radius surface 112, 114 spaced between the concave radius surface and the outer diameter of each ring, with this surface again having a radius less than one-fourth the wall thickness of the respective ring.

As briefly discussed above, ball movement is controlled by axial movement of the actuator sleeve 50, which is accomplished by the introduction of fluid pressure in opening port 120 or closing port 122. Those skilled in the art will appreciate that various porting arrangements may be used for providing fluid pressure to the sleeve, which will shift the sleeve axially and rotate the ball. If desired, movement of the sleeve in one direction, e.g., in the valve closed direction, may be accomplished by a biasing spring, so that fluid pressure overcomes this biasing force to open the valve.

Figure 2:
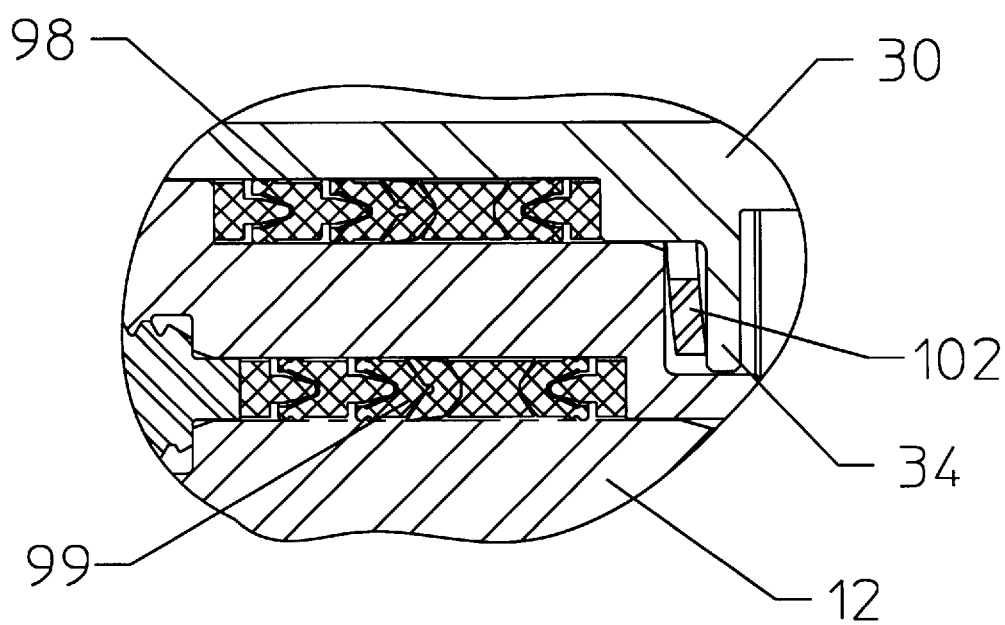
FIG. 2 is an enlarged view of the seals between the valve body and an upper nut, and between the upper nut and seat ring.
Figure 4:
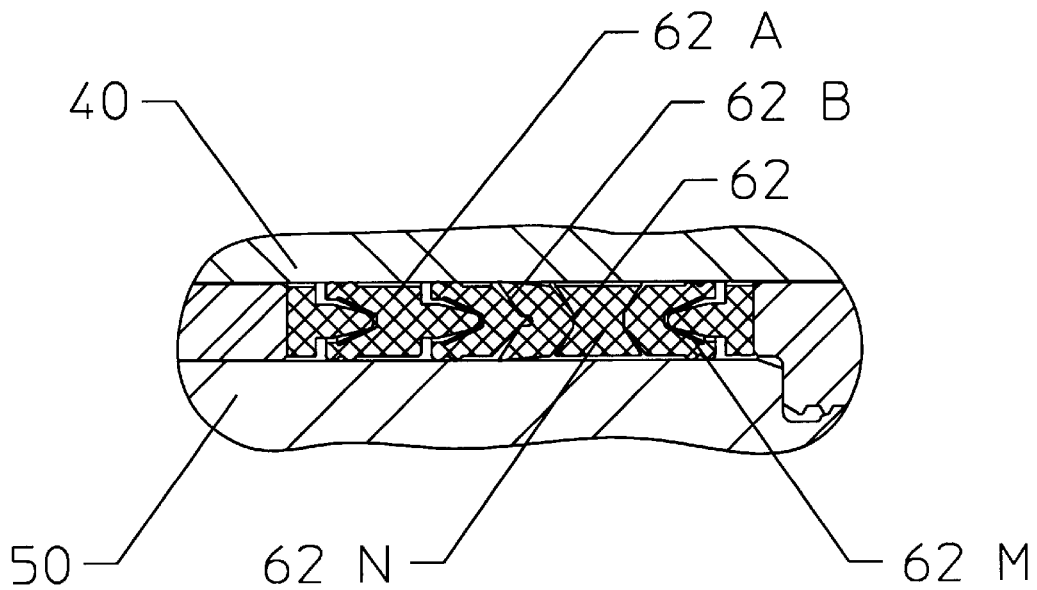
FIG. 4 is an enlarged view of the seal between the actuator sleeve and the support ring.

As shown in FIG. 1, each of the seals 60, 62, 66, 98 and 99 include a plurality of axially spaced sealing elements. According to the present invention, the softer seal elements are provided near the fluid pressure, and the harder seal elements are axially downstream from the fluid pressure. Assuming the ball is closed and pressure is downstream of the ball, seal 62, for example, includes axially spaced seal element 62A, 62B which are formed from a relatively soft elastomer, and one or more seal elements 62M, 62N formed from a harder seal element, such as a plastic or a soft metal. Each of these seals also seals hydraulic fluid pressure provided in one of the ports 120, 122. As shown in FIGS. 2, 4, and 5, each of these seals is also a bi-directional seal, i.e., each seal includes fluid energized seal elements, with one of these seal elements being energized by fluid pressure (either bore pressure or hydraulic pressure) regardless of whether that pressure is upstream or downstream of the seal. Each of these seals also includes stacked or axially spaced seal elements, with the seal elements for each seal preferably being in a common cavity in the valve. Seals 60, 62 are each supported on a respective shoulder of the actuating sleeve when fluid pressure is applied, whether that be shoulder 78, shoulder 88 or the shoulder formed by the nut 75 or 84. Each of the seals 66, 98, and 99 are also supported on a shoulder of the ring 72, nut 70, nut 90, or the retainer ring 94 when the bore pressure is applied, each shoulder being fixed to the valve body. The seals may perform at elevated temperatures of 250° F. or higher.

As shown in FIGS. 1 and 3, the seal 64 provides reliable sealing between the actuator sleeve 50 and the valve body 12. Preferably the seal 64 comprises a plurality of axially spaced guide rings 170, 172, and 174, with each of these rings, whether manufactured from a plastic, metal or other material, minimizing the metal-to-metal contact between the sleeve 50 and the body 12. The seal 64 moves with the actuator sleeve during operation of the valve, and accordingly is subject to the hydraulic fluid pressure within ports 120, 122. A minor amount of leakage past the seal 64 is permitted, since the downstream side of the seal 64 is vented when hydraulic pressure is applied to the upstream side of the seal.

The first and fourth seals seal, i.e., seal 60 and seals 98, 99, seal against an outer diameter of the seat ring. The outer diameter of the seal 99 is greater than the inner diameter of the seal 60, so that bore pressure from above exerts a force on the first and fourth seals which is transmitted to the seat ring in an axial direction toward the ball. The support ring similarly has at least two seals 62, 66 sealing with the support ring. The ID of the seal 62 is substantially equal to the ID of the seal 66, so that substantially no axial force is transmitted to the ball by the downstream fluid pressure.

The actuating sleeve 50 is a continuous solid sleeve between the left side of the ball as shown in FIG. 1 sealing with seal 60 and the right side of the ball sealing with the seal 62, such that the actuating sleeve maintains fluid pressure within the valve body. The holes in the actuator sleeve discussed below thus terminate prior to the exterior surface of the actuator sleeve. The actuating sleeve 50 thus retains fluid pressure within its interior, and is responsive to hydraulic pressure from outside the ball valve assembly transmitted through one of the ports 120, 122.

The ball 14 is preferably formed from the high strength material. The functional part of the support ring 40, which is the ball engaging ring portion 44 as shown in FIG. 10, is similarly formed from a high strength material. The seat ring 30, on the other hand, is formed from a comparatively low strength material, although as shown in FIG. 9, the upstream seat ring may include a relatively thin high strength coating 130 thereon, with a high strength coating having a thickness less than about 0.10 inches, and preferably less than about 0.008 inches. The ball and the ring 44 may thus be made from a ceramic or tungsten carbide material with a compressive strength greater than 300,000 psi, a tensile strength greater than 200,000 psi, and a modulus of elasticity greater than 50 E 6 psi. The seat ring 30 may be manufactured from a material softer than the preferred material of the ball, with a yield strength less than 150,000 psi and a modulus of elasticity less than about 30 E 6 psi. The seat ring 30 and the seal ring 46 may be formed from one or more of steel, stainless steel, a nickel-based material, a titanium-based material, or a beryllium cooper material. The support ring is thus preferably formed from two pieces 44 and 46 of dissimilar materials, with the harder material contacting the ball and the softer material providing pressure containment. In a preferred embodiment as shown in FIG. 10, a junction of the two materials is displaced between the ball and the seal 62, so that sealing integrity between the two dissimilar pieces is not required. When the ball is closed and the valve is flooded downstream bore pressure, the absence of a seal at the junction between the two dissimilar materials is of no significant consequence.

As discussed below, each of the seal ring 30 and the ball 14 may be made from either metal or a ceramic material, thereby providing the possibility for the upstream seat ring providing any one of a metal-to-metal, metal-to-ceramic, or a ceramic-to-ceramic seal with the ball.

Figure 6:
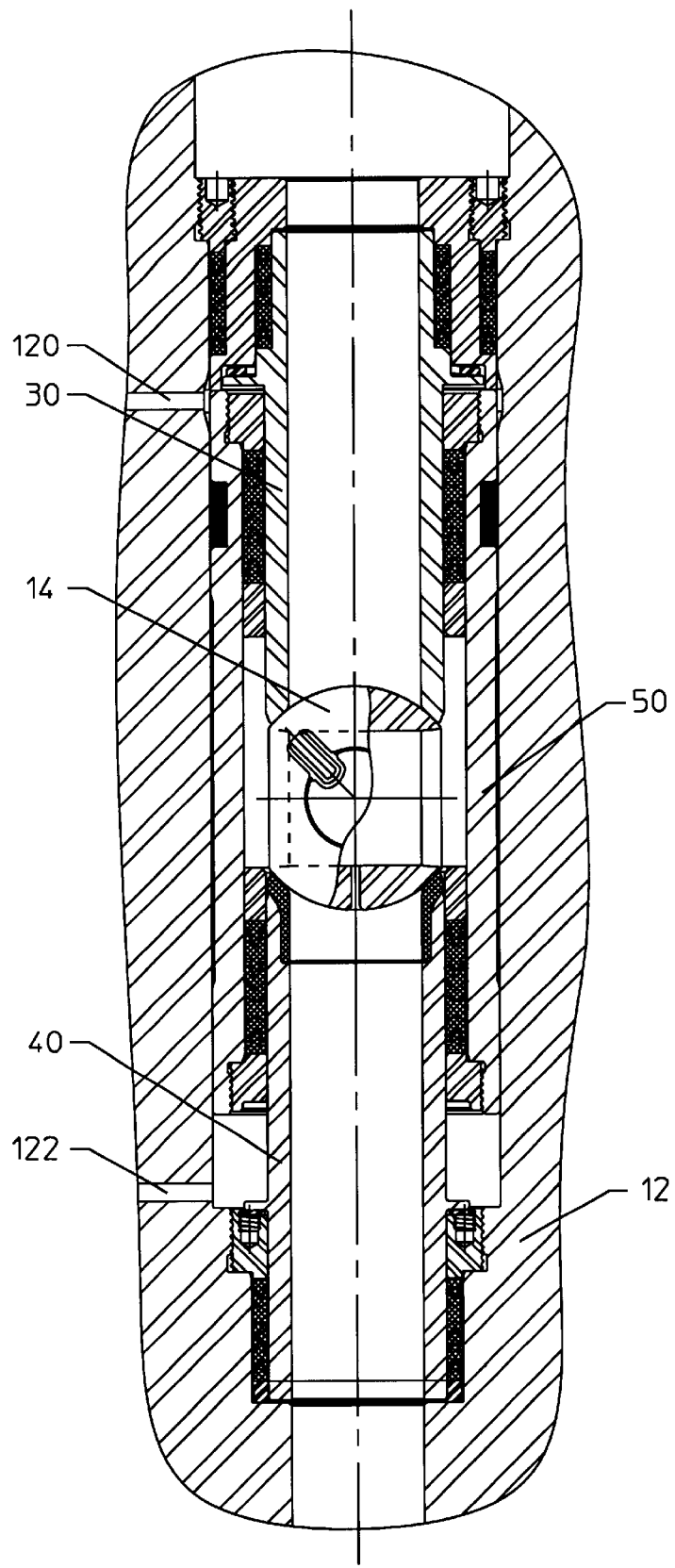
FIG. 6 shows the ball in the closed position.
Figure 7:
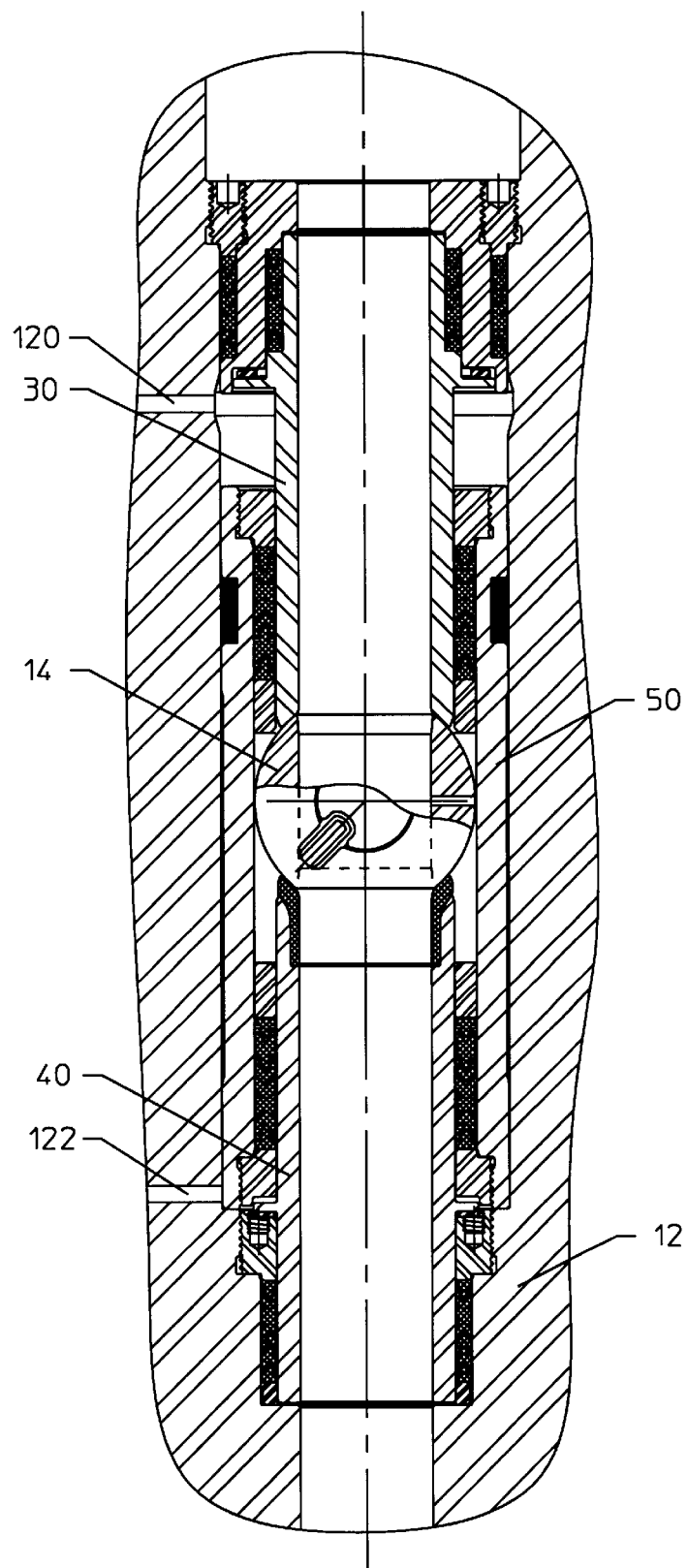
FIG. 7 shows the ball in the open position.

FIG. 6 depicts ball valve assembly in the ball closed position. The hydraulic pressure in port 122 forces the actuator sleeve 50 toward the seat ring. FIG. 7 depicts the ball valve assembly in the closed position, with fluid pressure in port 120 forcing the actuator sleeve downward toward the support ring to open the ball.

Figure 8:
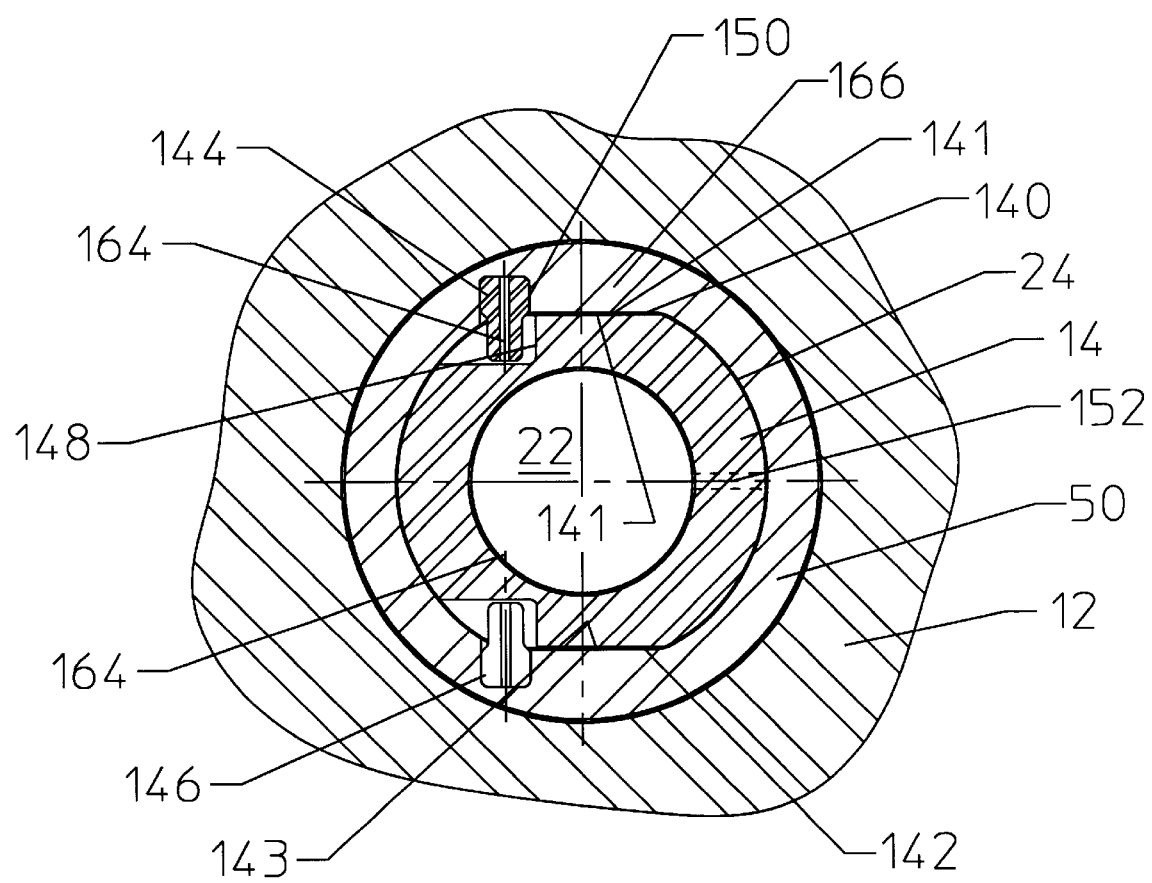
FIG. 8 shows the innerconnection between the ball and the actuating sleeve.

As shown in FIG. 8, the ball 14 includes radially opposing flats 140, 142 which cooperate with similar flats 141, 143 on the actuating sleeve 50 during operation of the valve. A pin member 144, 146 extends from each flat into a slot 148 in the ball and hole 150 in the actuating sleeve. Those skilled in the art will appreciate that the slots in the ball and holes in the actuating sleeve are configured such that the ball is rotated between the open position and the closed position as the actuating sleeve moves axially with respect to the valve body. More particularly, each pin member includes a flat or non-cylindrical surface for engaging a similar flat or non-cylindrical surface on the ball to limit rotation of each pin member with respect to the ball. Each pin member also includes a cylindrical portion which extends into the hole 150 in the actuating sleeve, with the cylindrical portion of the pin member and the slot in the actuating sleeve cooperating for allowing rotation of the pin member with respect to the actuating sleeve during axial movement of the sleeve, so that the ball and the pin members effectively rotate together as the actuating sleeve moves from the closed to the open position. By providing flats and prohibiting the pin members from rotating with respect to the ball during operation of the valve, coupled with allowing rotation between the cylindrical end of the pin members and the sleeve during valve operation, a high torque is available to the ball near the end of the stroke of the actuating sleeve, i.e., during the final closing and initial opening of the ball. This arrangement provides a compact ball valve assembly designed with a minimal axial travel of the sleeve to rotate the ball between the open and the closed position.

A preferred actuator sleeve 50 thus includes an elongated middle section 166 which includes surfaces 141, 143 for closely mating with the flats 140, 142 on the ball, and an interior cylindrical surface closely adjacent the outer diameter of the ball. The pins 144, 146 each rotate in a hole 150 machined in the sleeve 50 opposite each flat face on the ball, so that the ball closely mates with the sleeve.

Figure 11:
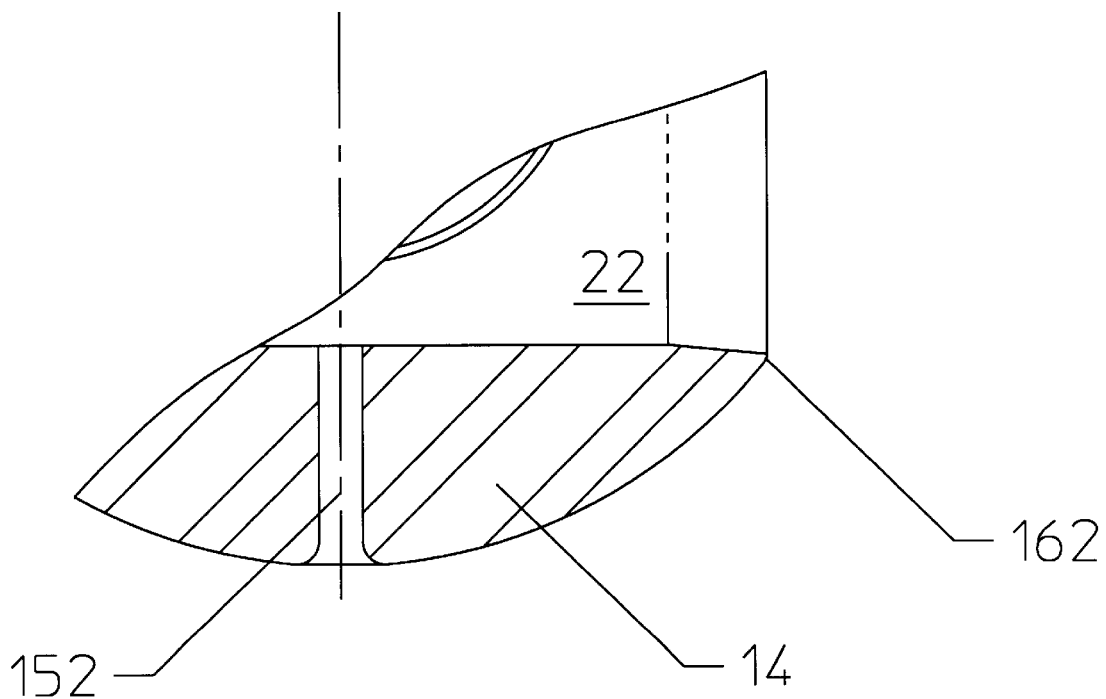
FIG. 11 depicts a portion of the ball generally shown in FIG. 1.

The ball 14 preferably has a uniform diameter symmetrically positioned bore 22. The ball 14 preferably includes a vent bore 152 as shown in FIG. 8 for venting between the through port 22 and the exterior surface 24 of the ball pressure trapped between the first and second seals and between the rings 30, 40 and the ball. The vent bore 152 preferably has an axis substantially 90° to an axis of the through port 22 in the ball, and preferably has a diameter less than approximately 20% of the diameter of the through port in the ball. A curved end surface 162 at each end of the ball as shown in FIG. 11 from the bore 22 to the exterior spherical surface 24 of the ball preferably has a convex radius less than 10% of the radius of through bore in the ball.

The pair of pin member 144, 146 have a common axis of rotation 164 which is preferably perpendicular to an axis 11 of the actuator sleeve 50. In a preferred embodiment, an axial travel of the actuator sleeve is less than approximately ⅓ of the through port diameter through the ball to achieve 90° rotation of the ball. The coupling pin members 144, 146 as shown in FIG. 8 also each include a small vent hole 164 to prevent pressure actuation due to pressure lock at either end of a pin member. The coupling pins 144, 146 preferably are made from material with a yield strength greater than 200,000 psi. During assembly of the valve, the pins 80, 82 are each positioned within a corresponding slot in the actuator sleeve 50 and the ball 14 is then positioned within the actuator sleeve such that the pair of pin members are positioned within the slots in the ball.

When the ball is closed and fluid pressure is upstream, there is more contact pressure on the ball than when an equal fluid pressure is from below, since the seat ring acts as a piston to add axial force to the ball in response to upstream pressure. When the ball is closed and test pressure is exerted from above, the upper seat is tested, which is the same seat that is sealing with the ball when fluid pressure is above or below the ball. Preferably the support ring carries more axial load at the ball to support ring interface than does the seat ring, since the seat ring also acts as a piston creating an additional axial force on the ball which is transmitted to the support ring, while the support ring does not exert pressure on the ball so only the pressure below a closed ball exerts force on the seat ring. By providing a vent hole in the ball or by providing a notch in the support ring, sealing engagement of the ball and the support ring may be easily and intentionally prevented.

Various modifications to the ball valve will be apparent to those skilled in the art from the foregoing description. For example, the ball valve assembly may be provided with a spring or other biasing member for mechanically biasing the sleeve in one axial position. This biasing force alone or in conjunction with hydraulic pressure may be used to shift the valve in one position, with hydraulic pressure then being used to shift the valve in the opposing position. A spring may thus bias the actuator sleeve so that the ball is normally closed, and the ball is opened only in response to hydraulic pressure in the open valve hydraulic port.

By providing a slot in the ball which cooperates with the pin and a hole in the sleeve for receiving an opposed end of the pin, high torque is available to the ball near the end of the stroke of the actuating sleeve, as discussed above, while still maintaining a compact design for the ball valve. In another embodiment, a pair of slots may be provided in the actuator sleeve and the holes provided in the ball. In this embodiment, the pin members would still be rotatably secured to the ball and would move along the length of the slots in the sleeve during actuation. Slots are thus preferably provided in the ball and holes in the sleeve for receiving the opposed ends of the pins, although the slots could be provided in the actuator sleeve and the holes provided in the ball.

The valve body as discussed above is a tubing hanger body designed to support a tubing string in a well. As indicated, the present invention has utility to other oil and gas production equipment, including downhole safety valves and surface valves, each having a valve body, and to multiple valve systems, such as manifolds, which may use a unitary block housing multiple balls, and manifolds wherein one or more of the valve bodies are interconnected structurally and fluidly so that the system acts as a manifold.

The valve as discussed above periodically references fluid pressure within the bore 20 and the valve body to the left of the ball 14 as being upstream pressure, and pressure to the right of the ball 14 being downstream pressure. Similarly, various components of the valve are discussed within respect to the left-side of the assembly as shown in FIG. 1 being the upper end of the assembly, while the right-side components are discussed as being lower components. The terms "upstream", "downstream", "upper", and "lower" are not intended in a limiting sense, since the arrangement of the valve within a system will determine the position of the components relative to each other. Similarly, the valve as discussed herein for use within the body of a tubing hanger is tested by upstream pressure, i.e., fluid pressure from above the ball is applied to check for sealing integrity between the seat ring and the ball. In normal tubing hanger operations, the installed valve will contain fluid pressure from the well which will be from the right side or the downstream end of the assembly as shown. The term "upstream" is broadly intended to mean the end of the assembly which houses the seat ring, while the term "downstream" broadly means the end of the assembly housing the support ring, regardless of which direction the bore pressure is applied to the valve.

The foregoing disclosure and description of the invention is illustrative and explanatory of preferred embodiments. It would be appreciated by those skilled in the art that various changes in the size, shape of materials, as well in the details of the illustrated construction or combination of features discussed herein maybe made without departing from the spirit of the invention, which is defined by the following claims.

What is claimed is:

1. A ball valve assembly, comprising:
    a valve body having an inlet port, an outlet port, a passageway there-between for transmitting fluid, and at least one of an open valve hydraulic port and a closed valve hydraulic port;
    a ball within the valve body having a through port therein and a spherical exterior surface, the ball being rotatable within the valve body for rotation between an open position and a closed position;
    a seat ring within the valve body for sealing engagement with the spherical exterior surface of the ball when the ball is in the closed position and fluid pressure is upstream or downstream of the ball;
    a support ring for engaging the exterior surface of the ball when the ball is in the closed position and supporting the ball when fluid pressure is upstream of the ball;
    an actuator sleeve surrounding the ball and axially moveable within the valve body for rotating the ball between the open position and the closed position, hydraulic pressure in the at least one hydraulic port moving the actuator sleeve axially within the valve body;
    a first seal between the seat ring and the actuator sleeve;
    a second seal between the support ring and the actuator sleeve;
    a third seal between the actuator sleeve and the valve body;
    a fourth seal between the seat ring and the valve body;
    a fifth seal between the support ring and the valve body; and
    the fourth seal having a diameter greater than the first seal such that fluid pressure within the seat ring exerts a force on the first seal and the fourth seal which is transmitted to the seat ring in an axial direction toward the ball.

2. A ball valve assembly as defined in claim 1, wherein each of the seat ring and the support ring has a substantially spherical ball engaging concave radius surface for mating engagement with the spherical exterior surface of the ball.

3. A ball valve assembly as defined in claim 2, wherein the seat ring and the support ring each has an inner convex radius surface spaced between the ball engaging surface and an inner diameter of the ring, each inner convex radius surface having a radius less than one-half a wall thickness of the respective ring.

4. A ball valve assembly as defined in claim 3, wherein the inner convex radius surface on the support ring is at least 50% greater than the inner convex radius surface on the seat ring to distribute high contact forces applied from the ball to the support ring.

5. A ball valve assembly as defined in claim 3, wherein each of seat ring and the support ring has an outer convex radius surface spaced between the ball engaging surface and an outer diameter of the ring, each convex radius surface having a radius less than one-fourth a wall thickness of the respective ring.

6. A ball valve assembly as defined in claim 2, wherein the seat ring has an inner convex radius surface spaced between the concave radius surface and an inner diameter of the seat ring, the concave radius surface on the seat ring providing low pressure sealing and the inner convex radius surface on the seat ring providing high pressure sealing when the seat ring diameter increases in response to high fluid pressure.

7. A ball valve assembly as defined in claim 1, wherein each of the seat ring and the support ring has a wall thickness from 0.3 to 0.6 times a radius of a bore through the respective ring.

8. A ball valve assembly as defined in claim 1, further comprising:
the valve body including both the open valve hydraulic port and the closed valve hydraulic port; and
the first seal and the fourth seal each comprises a plurality of annular seal members.

9. A ball valve assembly as defined in claim 1, wherein the second seal and the fifth seal each comprises a plurality of seal members, a diameter of an second seal being substantially equal to a diameter of the fourth seal, such that fluid pressure from within the support ring exerts substantially no axial force on the lower seat member.

10. A ball valve assembly as defined in claim 1, wherein each of the first, second, fourth and fifth seals include plurality of axially spaced sealing elements, with softer seal elements near fluid pressure and harder seal elements downstream from fluid pressure.

11. A ball valve assembly as defined in claim 10, wherein each of the first, second, fourth and fifth seals are bi-directional seals which seal fluid pressure within the valve body passageway and hydraulic pressure to a respective hydraulic port.

12. A ball valve assembly as defined in claim 1, wherein each of the first and second seals are each supported on a shoulder on the actuator sleeve when sealing fluid pressure within the valve body passageway.

13. A ball valve assembly as defined in claim 1, wherein each of the fourth and fifth seals are each supported on a shoulder removably fixed to the valve body when sealing fluid pressure within the valve body passageway.

14. A ball valve assembly as defined in claim 1, wherein the fourth seal comprises:
a radially inner seal for sealing with the seat ring and a metal annular member structurally separate from the seat ring and the valve body; and
a radially outer seal for sealing with the metal annular member and the valve body.

15. A ball valve assembly as defined in claim 1, wherein the seat ring provided one of a metal-to-metal, metal-to-ceramic, and ceramic-to-ceramic seal with the ball.

16. A ball valve assembly as defined in claim 1, further comprising:
first and second energizer springs for urging the seat ring and the support ring, respectively, toward the ball, the first and second energizer springs having a substantial equal biasing force to overcome friction by the first and second seals, respectively.

17. A ball valve assembly as defined in claim 1, wherein the valve body is a tubing hanger for supporting a tubing string in a well.

18. A ball valve as defined in claim 1, wherein the valve body is a manifold block.

19. A ball valve as defined in claim 1, wherein the valve body is a downhole safety valve body.

20. A ball valve as defined in claim 1, wherein the through port in the ball is positioned such that the ball is rotated 90° between the open position and the closed position.

21. A ball valve assembly, comprising:
a valve body having an inlet port, an outlet port, a passageway there between for transmitting fluid from the inlet port to the outlet port, and at least one of an open valve hydraulic port and a closed valve hydraulic port;
a ball within the valve body having a through port therein and a spherical exterior surface, the ball being rotated within the valve body for rotation between an open position and a closed position;
a seat ring having a concave radius surface within the valve body for sealing engagement with the spherical exterior surface of the ball when the ball is in the closed position and fluid pressure is upstream or downstream of the ball;
a support ring for engaging the exterior surface of the ball when the ball is in the closed position and supporting the ball when fluid pressure is upstream of the ball, one of the support ring and the ball including a fluid passageway for preventing sealed engagement of the ball and the support ring;
an actuator sleeve surrounding the ball and axially moveable within to the valve body for rotating the ball between the open position and the closed position, hydraulic pressure in the at least one hydraulic port moving the actuator sleeve axially within the valve body; and
the actuating sleeve being continuous between an upper end above the ball and a lower end below the ball, such that the actuating sleeve maintains fluid pressure within the valve body when the ball is in the open position,
wherein the actuator sleeve supports a plurality of axially spaced guide rings to minimize metal-to-metal contact between the sleeve and the valve body.

22. The ball valve assembly as defined in claim 21, wherein the valve body includes the open valve hydraulic port and the closed valve hydraulic port, and the seat ring maintains hydraulic pressure exterior of the seat ring and the support ring maintains hydraulic pressure exterior of the support ring.

23. A ball valve assembly as defined in claim 21, wherein the support ring comprises:
a ball engaging ring for engaging the exterior surface of the ball when the ball is in the closed position, the ball engaging ring being formed from a high strength material;
a seal ring spaced opposite the ball with respect to the ball engaging ring, the ball engaging ring and the seal ring being connected at a juncture; and
a seal between the support ring and the actuator sleeve is spaced opposite the ball with respect to the juncture.

24. A ball valve assembly as defined in claim 21, wherein the seat ring and the support ring each has an inner convex radius surface spaced between the ball engaging surface and an inner diameter of the ring, each inner convex radius surface having a radius less than one-half a wall thickness of the respective ring.

25. A ball valve assembly as defined in claim 21, wherein the seat ring has an inner convex radius surface spaced between the concave radius surface and an inner diameter of the seat ring, the concave radius surface on the seat ring providing low pressure sealing and the inner convex radius surface on the seat ring providing high pressure sealing when the seat ring diameter increases in response to high fluid pressure.

26. A ball valve assembly as defined in claim 21, wherein each of the seat ring and the support ring has a wall thickness from 0.3 to 0.6 times a radius of a bore through the respective ring.

27. A ball valve assembly as defined in claim 21, wherein each of a first seal for sealing between the seat ring and the rotator sleeve and a second seal for sealing between the support ring and the actuator sleeve include plurality of axially spaced sealing elements, with softer seal elements near fluid pressure and harder seal elements downstream from fluid pressure.

28. A ball valve assembly as defined in claim 21, further comprising:
a radially inner seal for sealing with the seat ring and a metal annular member structurally separate from the seat ring and the valve body; and
a radially outer seal for sealing with the metal annular member and the valve body.

29. A ball valve assembly as defined in claim 21, further comprising:
first and second energizer springs for urging the seat ring and the support ring, respectively, toward the ball, the first and second energizer springs having a substantial equal biasing force to overcome friction by the first and second seals, respectively.

30. A ball valve assembly, comprising:
a valve body having an inlet port, an outlet port, a passageway there between for transmitting fluid from the inlet port to the outlet port, and at least one of an open valve hydraulic port and a closed valve hydraulic port;
a ball within the valve body having a through port therein and a spherical exterior surface, the ball being positioned within the valve body for rotation between an open position and a closed position;
a seat ring within the valve body for sealing engagement with the spherical exterior surface of the ball when the ball is in the closed position and fluid pressure is upstream of the ball;
a support ring for engaging the exterior surface of the ball when the ball is in the closed position and supporting the ball when fluid pressure is upstream of the ball;
an actuator sleeve surrounding the ball and axially moveable with respect to the valve body for rotating the ball between the open position and the closed position;
the ball being formed from a high strength material;
a ball engaging ring of the support ring being formed from a high strength material; and
the seat ring being formed from a low strength material.

31. A ball valve assembly as defined in claim 30, wherein the seat ring includes a high strength material coating on surfaces of the seat ring for sealing engagement with the ball.

32. A ball valve assembly as defined in claim 30, wherein each of the ball and the ball engaging ring of the support ring is formed from one or more of a ceramic material and a tungsten carbide material.

33. A ball valve assembly as defined in claim 30, wherein the seat ring is formed from one or more of steel, stainless steel, a nickel-based material, a titanium-based material, and a beryllium copper material.

34. A ball valve assembly as defined in claim 30, wherein the support ring is formed from two pieces of dissimilar materials, the harder material ring contacting the ball and the softer material ring sealing with a seal between the support ring and the actuator sleeve for fluid containment.

35. A ball valve assembly as defined in claim 34, wherein a juncture of the two materials is spaced between the ball and the seal.

36. A ball valve assembly as defined in claim 34, wherein each of the ball and harder material ring are formed from material having a compressive strength greater than 300,000 psi, a tensile strength greater than 200,000 psi, and modulus of elasticity greater than about 50 E 6 psi.

37. A ball valve assembly as defined in claim 36, wherein the seat ring is formed from material having a yield strength less than 150,000 psi and a modulus of elasticity of less than about 30 E 6 psi.

38. The ball valve assembly as defined in claim 30, wherein an interface between the spherical outer surface of the ball and the through port in the ball includes a curved end surface having a radius less than 10% the diameter of the through port in the ball.

39. A ball valve assembly as defined in claim 30, further comprising:
first and second energizer springs for urging the seat ring and the support ring, respectively, toward the ball, the first and second energizer springs having a substantial equal biasing force to overcome friction by the first and second seals, respectively.

40. A ball valve assembly, comprising:
a valve body having an inlet port, an outlet port, a passageway there between for transmitting fluid from the inlet port to the outlet port, and at least one of an open valve hydraulic port and a closed valve hydraulic port;
a ball having a through port therein and a spherical exterior surface, the ball being positioned within the valve body for rotation between an open position and a closed position;
a seat ring within the valve body for sealing engagement with the spherical exterior surface of the ball when the ball is in the closed position and fluid pressure is upstream or downstream of the ball;
a support ring for engaging the exterior surface of the ball when the ball is in the closed position and supporting the ball when fluid pressure is upstream of the ball;
an actuator sleeve surrounding the ball and axially moveable with respect to the valve body for rotating the ball between the open position and the closed position;
the ball having radial opposing flats for cooperation with corresponding flats on the actuating sleeve; and
a pair of opposing pin members each extending between a flat on the ball and a corresponding flat on the sleeve for positioning within a slot in one of the ball and the sleeve and a hole in the other of the ball and the sleeve to rotate the ball between the open position and the closed position in response to axial movement of the sleeve.

41. A ball valve assembly as defined in claim 40, wherein the actuator sleeve includes an interior cylindrical surface adjacent the exterior spherical surface of the ball.

42. A ball valve assembly as defined in claim 40, wherein the ball includes a vent hole from the exterior spherical surface of the ball to the through port in the ball for venting trapped pressure between first and second seals.

43. A ball valve assembly as defined in claim 42, wherein the vent hole has an axis substantially 90° to an axis of the through port in the ball.

44. A ball valve assembly as defined in claim 42, wherein the vent hole has a diameter less than approximately 20% of a diameter of through port in the ball.

45. A ball valve assembly as defined in claim 40, wherein a curved end surface of the ball between the bore and the exterior spherical surface of the ball has a convex radius less than 10% of a radius of the through bore in the ball.

46. A ball valve assembly as defined in claim 40, wherein the ball is formed from one of tungsten carbide and a ceramic material.

47. A ball valve assembly as defined in claim 40, wherein the pair of pin members have a common axis of rotation substantially perpendicular to an axis of the actuator sleeve.

48. A ball valve assembly as defined in claim 40, wherein axial travel of the actuator sleeve less than approximately one-third of the through port diameter through the ball results in 90° rotation of the ball.

49. A ball valve assembly as defined in claim 40, wherein the holes are provided in the actuator sleeve and terminate prior to an exterior surface of the actuator sleeve.

50. A ball valve assembly as defined in claim 40, wherein the pair of pin members each includes a vent hole to prevent pressure actuation due to pressure lock at either end of the pin member.

51. A ball valve assembly as defined in claim 40, wherein each of the pair of pin members includes an anti-rotation surface for engagement with a corresponding surface on the ball to limit rotation of each pin with respect to the ball.

52. A ball valve assembly as defined in claim 51, wherein each of the pair of pin members includes a cylindrical surface for rotation of the pin member with respect to the sleeve during axial movement of the sleeve.

53. A ball valve assembly as defined in claim 40, wherein each of the pair of pin members is positioned within a corresponding hole in the actuator sleeve, then the ball is positioned within the actuator sleeve and the pair of pin members positioned within a slot in the ball.

54. A ball valve assembly as defined in claim 40, wherein the valve body includes the open valve hydraulic port and the closed valve hydraulic port, and the seat ring maintains hydraulic pressure exterior of the seat ring and the support ring maintains hydraulic pressure exterior of the support ring.

* * * * *